(12) United States Patent
Zhang et al.

(10) Patent No.: US 12,346,466 B2
(45) Date of Patent: Jul. 1, 2025

(54) METHOD, APPARATUS, DEVICE, AND MEDIUM FOR PERMISSION PROCESSING

(71) Applicant: Beijing Zitiao Network Technology Co., Ltd., Beijing (CN)

(72) Inventors: Shuang Zhang, Beijing (CN); Yiliang Lu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/807,827

(22) Filed: Aug. 16, 2024

(65) Prior Publication Data

US 2024/0411907 A1 Dec. 12, 2024

Related U.S. Application Data

(63) Continuation of application No. PCT/CN2023/076330, filed on Feb. 16, 2023.

(30) Foreign Application Priority Data

Feb. 17, 2022 (CN) .......................... 202210146263.8

(51) Int. Cl.
*G06F 16/16* (2019.01)
*G06F 21/62* (2013.01)
*H04N 7/15* (2006.01)

(52) U.S. Cl.
CPC .......... *G06F 21/6209* (2013.01); *H04N 7/155* (2013.01)

(58) Field of Classification Search
CPC ..................... G06F 21/6209; H04N 7/155
See application file for complete search history.

(56) References Cited

U.S. PATENT DOCUMENTS 10,628,631 B1 * 4/2020 Smuda .................. G06F 40/14
2014/0366098 A1 * 12/2014 Savage .................. H04L 67/62
709/205

(Continued)

FOREIGN PATENT DOCUMENTS

CN 101150537 A 3/2008
CN 110519545 A 11/2019

(Continued)

OTHER PUBLICATIONS

International Search Report for PCT/CN2023/076330, mailed Apr. 26, 2023, 7 pages.

(Continued)

*Primary Examiner* — Vance M Little
(74) *Attorney, Agent, or Firm* — Astute IP Law Group (57) ABSTRACT

Embodiments of the present disclosure relates to a method, apparatus, device and medium for permission processing. The method comprises: in response to a start of a document sharing cycle, granting each second user in a specified group an access permission to a target shared document upon monitoring that a first user shares the target shared document to the specified group; in response to monitoring that a client interface of the first user jumps from the target shared document to display an associated document of the target shared document, maintaining the access permission to the target shared document for the second user and maintaining an access permission to the associated document for the second user; and in response to an end of the document sharing cycle, revoking the access permission which is owned by the second user during the document sharing cycle.

20 Claims, 2 Drawing Sheets

(56) References Cited

U.S. PATENT DOCUMENTS

| | | | | |
|---|---|---|---|---|
| 2017/0093574 A1* | 3/2017 | D'Elena | ............... | G06F 21/6209 |
| 2017/0322929 A1* | 11/2017 | Hussain | ............... | G06F 9/45558 |
| 2017/0359331 A1* | 12/2017 | Bonnet | ................ | H04L 9/0836 |
| 2018/0300309 A1 | 10/2018 | Denoue et al. | | |
| 2020/0249902 A1* | 8/2020 | Taguchi | ................ | H04L 67/025 |
| 2020/0351265 A1* | 11/2020 | Srinath | ................. | H04N 7/152 |
| 2021/0218570 A1 | 7/2021 | Manasse et al. | | |
| 2022/0239655 A1* | 7/2022 | Viswanathan Iyer | ........................ H04L 63/105 | |
| 2022/0326902 A1* | 10/2022 | Raucher | ............. | H04M 7/0027 |

FOREIGN PATENT DOCUMENTS

| | | | |
|---|---|---|---|
| CN | 111177734 A | 5/2020 | |
| CN | 111680318 A | 9/2020 | |
| CN | 111817946 A | 10/2020 | |
| CN | 112257104 A | 1/2021 | |
| CN | 112311754 A | 2/2021 | |
| CN | 113741765 A | 12/2021 | |
| CN | 114491608 A | 5/2022 | |

OTHER PUBLICATIONS

Notice of Allowance received for Chinese Patent Application No. 202210146263.8, mailed on Sep. 11, 2023, 7 pages (2 pages of English Translation and 5 pages of Original Document).

Wang et al., "Research on permission revocation in dynamic security policies", Journal of Computer Applications, vol. 29, No. 7, 2009, 5 pages (1 page of English Abstract included).

\* cited by examiner

METHOD, APPARATUS, DEVICE, AND MEDIUM FOR PERMISSION PROCESSING

CROSS REFERENCE TO RELATED APPLICATION(S)

This application is a continuation of International Patent Application No. PCT/CN2023/076330, filed on Feb. 16, 2023, which claims the benefit of Chinese Patent Application No. 202210146263.8 filed on Feb. 17, 2022, both of which are incorporated herein by reference in their entireties.

FIELD

The present disclosure relates to the technical field of data processing, and in particular, to a method, apparatus, device and medium for permission processing.

BACKGROUND

With the development of the Internet, more and more users are choosing online meetings in place of offline meetings. Online meetings are more flexible and convenient, and are not restricted by spatial distance, so people in different geographic areas can attend the meeting at the same time.

Most of existing online meetings require document sharing, where the sharer can grant a temporary access permission to the sharee so that the sharee can access the shared document online. In the existing document sharing approach, if the sharer leaves the currently shared document A, the access permission of the sharee to the currently shared document A will be immediately revoked. However, in many cases, the sharer only switches from the currently shared document A to an associated document (such as a sub-document B of the currently shared document A) rather than ending the document sharing cycle. At this point, the sharee who is in the free browsing state cannot continue to view the shared document A because the permission is revoked, which results in poor document sharing effects and bad user experience.

SUMMARY

In order to solve the above-mentioned technical problems or at least partially solve them, this disclosure provides a method, apparatus, device and medium for permission processing.

Embodiments of the present disclosure provides a method for permission processing, comprising: in response to a start of a document sharing cycle, granting each second user in a specified group an access permission to a target shared document upon monitoring that a first user shares the target shared document to the specified group; in response to monitoring that a client interface of the first user jumps from the target shared document to display an associated document of the target shared document, maintaining the access permission to the target shared document for the second user and maintaining an access permission to the associated document for the second user; and in response to an end of the document sharing cycle, revoking the access permission which is owned by the second user during the document sharing cycle.

Optionally, the method further comprises: in accordance with a determination that an access request for a specified document is received from the second user, determining whether the second user currently has an access permission to the specified document; the specified document comprising the target shared document or the associated document; and in accordance with a determination that the second user currently has the access permission to the specified document, displaying the specified document on a client interface of the second user.

Optionally, the method further comprises: during the second user being in free browsing mode and a client interface of the second user being currently displaying the target shared document, continuing displaying the target shared document on the client interface of the second user in response to monitoring that the client interface of the first user jumps from the target shared document to display the associated document of the target shared document.

Optionally, granting each second user in the specified group the access permission to the target shared document comprises: recording a group identification of the specified group and a document identification of the target shared document in association in mutex information corresponding to a current meeting, so as to characterize that each second user in the specified group has the access permission to the target shared document during the current meeting; wherein the current meeting is an online meeting which the specified group is currently attending.

Optionally, the associated document is a sub-document of the target shared document, and the method further comprises: in response to monitoring that the client interface of the first user jumps from the target shared document to display an associated document of the target shared document for the first time, recording the group identification of the specified group and the document identification of the associated document in association in the mutex information corresponding to the current meeting, so as to characterize that each second user in the specified group has the access permission to the associated document during the current meeting.

Optionally, the target shared document is a sub-document of the associated document, and the method further comprises: before monitoring that the first user shares the target shared document to the specified group, in response to monitoring that the first user shares the associated document to the specified group during the document sharing cycle, recording the group identification of the specified group and the document identification of the associated document in association in the mutex information corresponding to the current meeting, so as to characterize that each second user in the specified group has the access permission to the associated document during the current meeting.

Optionally, revoking the access permission which is owned by the second user during the document sharing cycle comprises: deleting, from the mutex information, the group identification of the specified group and the document identification of the document to which the access permission is granted within the document sharing cycle.

Optionally, the method further comprises: in accordance with a determination that an access request for a specified document is received from a target user, querying whether the mutex information currently records a document identification of the specified document and a group identification of a specified group associated with the document identification; the specified document comprising the target shared document or the associated document; in accordance with a determination that the mutex information currently records the document identification and the group identification, determining, based on an identity of the target user, whether the target user belongs to second users in a specified group corresponding to the specified document; and in accordance with a determination that the target user belongs to second users in the specified group, displaying the specified document on a client interface of the target user.

Optionally, the online meeting which the specified group is currently attending is a branch-venue meeting; and the method further comprises: in response to monitoring that a target user enters the branch-venue meeting from a main-venue meeting, adding the target user to the specified group, and determining the target user as a newly added second user in the specified group; and in response to monitoring that a target second user in the specified group returns from the branch-venue meeting to a main-venue meeting, removing the target second user from the specified group.

Optionally, the target shared document is a main document, and the method further comprises: in response to receiving a sharing request initiated by the first user to share the target shared document to a specified group, determining that the first user shares the target shared document to the specified group.

Optionally, the target shared document is a sub-document embedded in a main document, and the method further comprises: in accordance with a determination that the first user shares the main document to the specified group, upon monitoring that the first user switches from the main document to the target shared document for the first time, determining that the first user shares the target shared document to the specified group.

Optionally, the method further comprises: determining the document sharing cycle based on a period from a document sharing triggering operation to a stopping sharing triggering operation of a user in a multimedia conference client.

Optionally, the stopping sharing triggering operation is triggered by an operator of the document sharing triggering operation, or is triggered by a document sharing triggering operation of a further participant in the multimedia conference.

Embodiments of the present disclosure further provides an apparatus for permission processing, comprising: a permission granting module configured for, in response to a start of a document sharing cycle, granting each second user in a specified group an access permission to a target shared document upon monitoring that a first user shares the target shared document to the specified group; a permission maintaining module configured for, in response to monitoring that a client interface of the first user jumps from the target shared document to display an associated document of the target shared document, maintaining the access permission to the target shared document for the second user and maintaining an access permission to the associated document for the second user; and a permission revoking module configured for, in response to an end of the document sharing cycle, revoking the access permission which is owned by the second user during the document sharing cycle.

Embodiments of the present disclosure further provides an electronic device, comprising: a processor; and a memory for storing instructions executable to the processor; the processor being configured for reading the executable instructions from the memory and executing the instructions to implement a method for permission processing provided by embodiments of the present disclosure.

Embodiments of the present disclosure further provides a computer-readable storage medium, wherein the storage medium stores a computer program, and the computer program is configured for performing a method for permission processing provided by embodiments of the present disclosure.

With the above technical solution provided by the embodiments of the present disclosure, in response to a start of a document sharing cycle, each second user in a specified group is granted an access permission to a target shared document upon monitoring that a first user shares the target shared document to the specified group; in response to monitoring that a client interface of the first user jumps from the target shared document to display an associated document of the target shared document, the access permission to the target shared document is maintained for the second user and an access permission to the associated document is maintained for the second user; and in response to an end of the document sharing cycle, the access permission which is owned by the second user during the document sharing cycle is revoked. In this way, after the first user (i.e., the sharer) grants each second user (i.e., the sharee) in the specified group an access permission to the target shared document, the access permission can always be maintained; even if the first user jumps from the target shared document to display the associated document, the access permissions to the target shared document and associated document can also be maintained for the second user until the access permissions are revoked at the end of the document sharing cycle. Thereby, it can be avoided that the sharee cannot view the document anymore because the share jumps between documents and the access permissions of the sharee are revoked during the document sharing cycle. Furthermore, the document sharing effects can be effectively guaranteed, and the user's document sharing experience improved.

It should be understood that what is described in this section is not intended to identify key or important features of the embodiments of the disclosure, nor is it intended to limit the scope of the present disclosure. Other features of the present disclosure will become readily understood from the following description.

BRIEF DESCRIPTION OF THE DRAWINGS

The accompanying drawings, which are incorporated in and constitute a part of this specification, illustrate embodiments consistent with the present disclosure and are used to explain the principles of the present disclosure together with the specification.

In order to more clearly illustrate the embodiments of the present disclosure or the technical solutions in the prior art, a brief introduction is presented below to the drawings to be used in the description of the embodiments or the prior art. It is obvious to those of ordinary skill in the art that other drawings can further be obtained based on these drawings without the exercise of any creative effort.

DETAILED DESCRIPTION

In order to enable a clearer understanding of the foregoing objectives, features and advantages of the present disclosure, the solutions of the present disclosure will be further described below. It should be noted that, as long as there is no conflict, the embodiments and features in the embodiments of the present disclosure can be combined with each other.

Many specific details are set forth in the following description to fully understand the present disclosure, whereas the present disclosure can further be implemented in other ways different from those described here; obviously, the embodiments in this specification are only part of the embodiments of the disclosure, rather than all of the embodiments.

The audio and video conferencing solution (i.e., online conferencing) refers to the remote transmission of sound, images, and file data between multiple parties through conference room hardware devices or end-to-end software bodies, plus the integration and cooperation of other applications, so as to achieve real-time and interactive communication and provide users with high-definition, efficient, and high-quality conferencing experience. Therefore, the problem of meeting costs caused by spatial distance can be effectively solved.

In online meeting scenarios, there is often a need for content sharing. Through content sharing, participants can understand what is being discussed in the meeting, making the meeting more efficient and targeted. In related arts, content sharing is usually realized through screen sharing, where the content displayed on the screen of the sharer can be shared with other participants as a video stream. However, the sharing approach as screen sharing has a higher network bandwidth consumption and higher network quality requirements due to the need to transmit video streams.

The applicant has found that the network bandwidth consumption caused by screen sharing can be improved through document sharing. Specifically, the sharer, when triggering document sharing, can share the storage address of the document with other participants (that is, sharees) and accordingly grant other participants temporary access permissions to access the document during the sharing period, so that the sharee can access the shared document and perform online reading/editing through access.

Furthermore, in the sharing mode of document sharing, it is possible for the sharee to freely choose whether to follow the sharer's operations on the shared document.

Specifically, on the one hand, if the sharee chooses to follow the sharer's operation on the shared document, the sharer's operation information on the shared document can be sent to the sharee on the basis of sharing the storage address of the document to the sharee. Further, on the sharee's client, the shared document can be rendered based on the storage address of the shared document and the sharer's operation information, so that the shared document displayed at the sharee is synchronous with the shared document displayed on the sharer end, for example, the sharer scrolling the mouse, the sharer playing the audio and video content in the shared document, the sharer opening the picture embedded in the shared document, etc.

On the other hand, if the sharee chooses not to follow the sharer's operation on the shared document, rendering can be performed in the sharee's client based on the sharer's operation on the shared document.

It can be understood that for the same sharee, they can freely choose whether to follow the sharer's operations on the shared document according to their own needs, and during the sharing period, they can switch between a following state (i.e., following the sharer's operation on the shared document) and a free browsing state (i.e., not following the sharer's operation on the shared document).

Normally, when the shared document is destroyed in the sharing window (in other words, the sharer leaves the current shared document), the sharee's temporary access permission to the shared document will be revoked immediately. The sharer may leave the shared document by stopping sharing or re-sharing a new document, or by jumping from the current shared document to its associated document, such as entering a sub-document of the current document when the current document is the main document, or returning to the main document to which the current document belongs when the current document is a sub-document. The sharer's jump between associated documents does not actually end the sharing cycle of the current document, but the sharee in the free browsing state cannot view the original document normally as the permission has been revoked. Thus, the document sharing effect is not good, and the user experience is poor. In order to improve the above problems, embodiments of the present disclosure provide a method, apparatus, device and medium for permission processing, which will be described in detail below.

Figure 1:
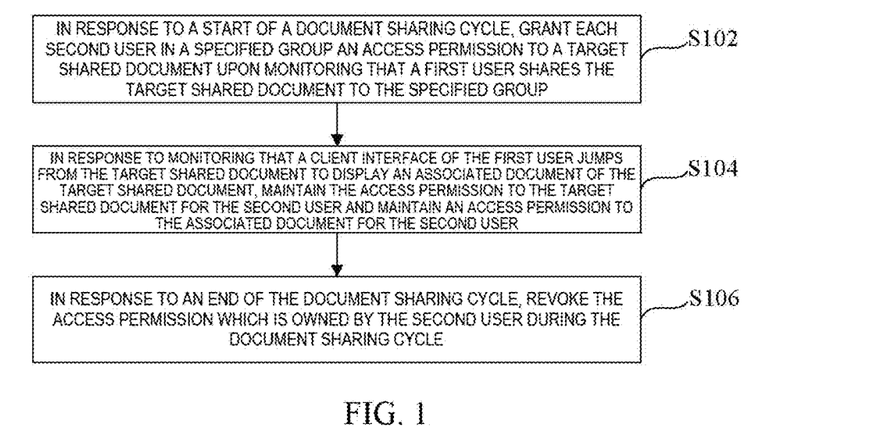
FIG. 1 is a schematic flowchart of a method for permission processing provided by embodiments of the present disclosure.

FIG. 1 is a schematic flowchart of a method for permission processing provided by embodiments of the present disclosure. The method can be performed by an apparatus for permission processing, which can be implemented by software and/or hardware and generally be integrated in an electronic device. As shown in FIG. 1, the method mainly comprises steps S102 to S104 as follows:

Step S102: In response to a start of a document sharing cycle, each second user in a specified group is granted an access permission to a target shared document upon monitoring that a first user shares the target shared document to the specified group.

In some implementations, the document sharing period may be determined based on a period from a user's document sharing triggering operation to a stopping sharing triggering operation in a multimedia conferencing client. The stopping sharing triggering operation is triggered by an operator of the document sharing triggering operation, or by a document sharing triggering operation of other participant in the multimedia conference. For the sake of understanding, as an example, a start point of the document sharing cycle is that the first user (sharer) performs a document sharing triggering operation in the multimedia conference client. The document sharing triggering operation may be to issue a document sharing instruction for a specified document or to display the specified document in a sharing window. An end point of the document sharing cycle is that the first user or other user attending the meeting (such as the second user) performs a stopping sharing trigger operation in the multimedia conference client. The stopping sharing trigger operation may be to issue a stopping sharing instruction for a specified document or re-share a new document. In some implementation examples, the specified document may be a target shared document or an associated document of the target shared document, such as a main document to which the target shared document belongs, or a nested sub-document of the target shared document.

The specified group usually contains a plurality of second users (shared persons). Upon monitoring that the first user shares the target shared document to the specified group, all users in the specified group can be granted access permissions to the target shared document, and the access permissions can be maintained all the time. In some implementations, the specified group may include all or part of the participants of the current meeting. When the specified group includes part of the participants, the specified group may be regarded as a sub-venue or group of the current meeting.

Step S104: In response to monitoring that a client interface of the first user jumps from the target shared document to display an associated document of the target shared document, the access permission to the target shared document is maintained for the second user and an access permission to the associated document is maintained for the second user. Specifically, an access permission to the associated document is granted to and maintained for the second user where the second user has not been granted access permission to the associated document, and an access permission to the associated document is continuously maintained for the second user where the second user has been granted the access permission to the associated document.

In some implementations, the associated document is a sub-document nested within the target shared document, and the target shared document can be regarded as a main document of the associated document. In other implementations, the target shared document is a sub-document nested within the associated document, and the associated documents can be regarded as a main document of the target shared document. During the specific implementation, the sub-document can be nested in the main document in the form of a link. By clicking on the link of the sub-document in the main document, it is possible to jump from the main document to the sub-document, or by closing the sub-document or clicking on a triggering button to return to the main document, it is possible to jump from the sub-document to the main document.

In the embodiments of the present disclosure, when it is monitored that the client interface of the first user jumps from the target shared document to display the associated document of the target shared document, the access permission to the target shared document can be maintained for the second user, and the access permission to the associated document can be maintained for the second user. The second user can have access permissions to both the target shared document and the associated document during the document sharing cycle. The client interface may be an interface of a multimedia conference client. It should be noted that if the associated document is a sub-document nested within the target shared document, when it is detected that the first user switches from the target shared document to display the associated document for the first time, not only the access permission to the target shared document will be maintained for the second user, but also the access permission to the associated document will be granted to the second user, and the access permissions to the target shared document and the associated document will be maintained for the second user all the time. If the target shared document is a sub-document nested within the associated document, before the first user shares the target shared document to the second user, typically the main document (i.e., associated document) of the target shared document has been shared to the second user. When the first user switches between the target shared document and the associated document, the embodiments of the present disclosure can always maintain the access permissions to the target shared document and the associated document.

Step S106: In response to an end of the document sharing cycle, the access permission which is owned by the second user during the document sharing cycle is revoked.

It should be noted that when the first user shares the target shared document to the specified group, the first user only temporarily grants the specified group access permissions to the target shared document during the document sharing cycle, that is, what the second user in the specified group obtains is only the temporary permission granted by the first user during the current document sharing cycle. After the document sharing cycle ends, the access permission granted to the second user in the specified group for the target shared document will be withdrawn (revoked). In actual applications, document access permissions may have multiple permission levels, such as "readable" permissions, "editable" permissions, etc. Assume that before the first user shares the target shared document to the second user in the specified group, the second user's access permission to the target shared document is "readable", and during the document sharing cycle, the access permission granted to the second user by the first user is "editable". Then, after the document sharing cycle ends, the second user's "editable" permission to the target shared document will be withdrawn, and the second user's access permission to the target shared document will be maintained at the initial "readable" level. Assume that before the first user shares the target shared document to the second user in the specified group, the second user does not have any level of access permissions to the document (neither editing nor reading) and only obtains the access permission (only reading, or both reading and editing) temporarily granted by the first user during the document sharing cycle. Then, after the document sharing cycle ends, the access permission obtained by the second user for the target shared document will be withdrawn, and the second user still does not have any level of access permissions to the target shared document. In summary, at the end of the document sharing cycle, what is revoked is the access permission granted to the second user during the document sharing cycle.

By means of the above approach, after the first user (i.e., the sharer) grants each second user (i.e., the sharee) in the specified group an access permission to the target shared document, the access permission to the target shared document can always be maintained; even if the first user jumps from the target shared document to display the associated document, the access permissions to the target shared document and associated documents can also be maintained for the second user until the access permissions are revoked at the end of the document sharing cycle. Thereby, it can be avoided that the sharee cannot view the document anymore because the share jumps between document and the access permission is revoked during the document sharing cycle. Furthermore, the document sharing effect can be effectively guaranteed, and the user's document sharing experience improved.

In the above step S102, the permission is granted only when it is monitored that the first user shares the target shared document to the specified group. The embodiments of the present disclosure further provide an approach to determining that the first user shares the target shared document to the specified group, which, specifically, can be implemented with reference to the following based on the target shared document:

(1) The target shared document is the main document. In response to receiving a sharing request initiated by the first user to share the target shared document to the specified group, it is determined that the first user shares the target shared document to the specified group. The specified group may be a group composed of some or all of participating members. Determining that the first user shares the target shared document to the specified group is to determine that the first user grants temporary permissions for the specified group during the document sharing cycle. Specifically, it is determined that the first user grants the second user in the specified group an access permission to the target shared document within the current document sharing cycle, and the access permission may be a "readable" permission or an "editable" permission, etc. It should be noted that the first user only grants the second user the access permission within the document sharing cycle, and after the document sharing cycle ends, the access permission granted to the second user by the first user during the document sharing cycle will be withdrawn.

(2) The target shared document is a sub-document embedded in the main document. If it is determined that the first user has shared the main document to the specified group, upon monitoring that the first user switches from the main document to the target shared document for the first time (e.g., the first user enters the target shared document for the first time by clicking on the target shared document link nested in the main document), it is determined that the first user shares the target shared document to the specified group. That is, if it is determined that the first user has shared the main document to the specified group in the current document sharing cycle (e.g., the first user has first granted the second user in the specified group an access permission to the main document at the beginning of the document sharing cycle), upon monitoring that the first user switches from the main document to the target shared document for the first time within the document sharing cycle, it is determined that the first user temporarily grants the specified group permissions to the target shared document embedded in the main document, and the second user in the specified group temporarily has the access permission granted by the first user during the current document sharing cycle. As an example, assume that the sharer has shared main document A to a specified group, and the sharer switches from main document A to sub-document B (target shared document) nested in main document A for the first time. Then, it is confirmed that the sharer has authorized to share sub-document B to the specified group. If the sharer stays in the main document but never clicks to enter sub-document B, the sharee in the free browsing state will not have an access permission to sub-document B, so as to ensure document security. Specifically, considering that the sharer may not want to display some sub-documents in the document to the participants, the sharee only obtains access permissions to the documents which have been displayed by the sharer during this sharing cycle. If the sharer clicks to enter the sub-document from the main document during the document sharing cycle, it is considered that the sharer has granted a permission to the sharee to access the sub-document. That is, when the sharer switches from the main document to the target shared document for the first time, it is confirmed that the sharer agrees to share the sub-document to the sharee (i.e., members of the specified group). It should also be noted that when the first user shares the target shared document and associated document to the specified group, the specified group is granted access permissions to the target shared document and associated document in the document sharing cycle only. That is, what the specified group has is only temporary access permissions granted within a document sharing cycle. After the document sharing cycle ends, the access permissions granted to the second user in the specified group for the target shared document and associated document will be withdrawn.

Once determining with the above approach that the first user shares the target shared document to the specified group, it is considered that it is monitored that the first user has shared the target shared document to the specified group.

Based on the above method for permission processing provided by the embodiments of the present disclosure, the embodiments further provide two application modes based on this method.

Application Approach 1:

If an access request for a specified document is received from the second user, it is judged whether the second user currently has an access permission to the specified document;

if yes, the specified document is displayed on the client interface of the second user. For example, the specified document may include the above-mentioned target shared document or associated document.

For example, if an access request for a specified document is received from the second user, first it will be judged whether the second user currently has an access permission to the document. Assume that the specified document is a nested sub-document B in main document A, and if the first user currently only shares main document A to the specified group but does not share sub-document B to the specified group. Then, the second user does not have an access permission to sub-document B. Otherwise, it is confirmed that the second user has an access permission to subdocument B. At this point, sub-document B can be displayed on the client interface of the second user.

Application Approach 2:

When the second user is in free browsing mode and the second user's client interface is currently displaying the target shared document, if it is monitored that the first user's client interface jumps from the target shared document to display the associated document of the target shared document, the target shared document is still displayed on the client interface of the second user. In some implementations, when the target shared document is a main document, its associated document is a sub-document of the target shared document; when the target shared document is a sub-document, its associated document is the main document to which the target shared document belongs.

In free browsing mode, the sharee (such as the second user) can read the currently shared document independently, and the sharer's operations on the document will not be rendered on the sharer's client. For example, the sharer can display the second page of shared document A on its client interface, while the sharee can display the first page of shared document A on its client interface, that is, the sharee can browse shared document A freely. The opposite mode is the following mode, in which the content displayed on the client interface of the sharee is consistent with the content displayed on the client interface of the sharer.

In the free browsing mode in the prior art, as long as the sharer leaves the currently shared document, the sharee's access permission to the currently shared document will be immediately revoked; even if the sharer only jumps back and forth between the main document and the sub-document (such as from the main document to a sub-document, or from a sub-document back to the main document), the access permission of the sharee will also be revoked. For example, the sharee has obtained the access permission to shared document A, and both the sharer and the sharee are browsing shared document A. When the sharer enters nested sub-document B from shared document A, the sharee's access permission to document A are immediately revoked, and shared document A can no longer be browsed. Or, assume that both the sharee and the sharer are reading sub-document B of shared document A, and when the sharer returns to shared document A, the sharee's access permission to sub-document B is also revoked, and sub-document B can no longer be browsed. In contrast, with the above approach provided by the embodiments of the present disclosure, when the sharee is in free browsing mode and the sharee's terminal interface is currently displaying shared document A, if it is monitored that the sharer's terminal interface jumps from shared document A to display sub-document B, the sharee's access permission to shared document A will not be revoked, but shared document A will continue to be displayed on the sharee's terminal interface. The sharee can continue to browse shared document A, and the sharee's access permission to shared document A can be maintained until the end of the document sharing cycle. For example, the sharee's access permission to shared document A will be revoked only when the sharer stops sharing or replaces a new document. In addition, after the sharer grants the sharee an access permission to sub-document B, the access permission to sub-document B will be retained for the sharee until the end of the document sharing cycle. During the document sharing cycle, the sharee can freely access shared document A and sub-document B, which greatly improves the document sharing experience.

Both the first user (sharer) and the second user (sharee) in the embodiments of the present disclosure use a multimedia conference client for online meetings. In some implementations, online meetings can be divided into main-venue meetings and branch-venue meetings. Users in the meeting can switch from the main-venue meeting to the branch-venue meeting, and can also return from the branch-venue meeting to the main-venue meeting. The shared content and access permissions of the main-venue meeting and branch-venue meeting can be independent of each other. In some implementations, the online meeting which the specified group is currently attending is a branch-venue meeting; the method provided by the embodiments of the present disclosure further comprises: in response to monitoring that a target user enters the branch-venue meeting from a main-venue meeting, adding the target user to the specified group, and determining the target user as a newly added second user in the specified group; and in response to monitoring that a target second user in the specified group returns from the branch-venue meeting to a main-venue meeting, removing the target second user from the specified group. That is to say, if sharing occurs in a branch-venue meeting, after participants exit the branch venue and enter the main venue, they will lose access permissions to documents shared in the branch venue during the document sharing cycle. On the contrary, when participants enter the branch venue from the main venue, they will automatically join the specified group of the branch venue, become members of the specified group, and have access permissions to the documents shared by the branch venue during the document sharing cycle.

In practical applications, in order to guarantee the convenience and reliability of technical implementation, the above step of granting each second user in the specified group the access permission to the target shared document comprises: recording a group identification of the specified group and a document identification of the target shared document in association in mutex information corresponding to a current meeting, so as to characterize that each second user in the specified group has the access permission to the target shared document during the current meeting; wherein the current meeting is an online meeting which the specified group is currently attending.

In order to ensure that the shared content in online meetings is unique and to ensure the security of content sharing in online meetings, each online meeting can correspond to a mutex, and the mutex can record the meeting identification (which can be used as a key of the mutex lock), or record the shared content of the meeting (can be used as a value of the mutex). In some specific implementations, the mutex can be implemented using the CAS update function of the kv database. When each second user in the specified group is granted an access permission to the target shared document, the group identification of the specified group and the document identification of the target shared document can be directly recorded in association with each other in the mutex information corresponding to the current meeting, and both can be used as the value in the mutex. The reason for taking the above approach is that when updating the shared state (such as meeting state, shared content in the meeting, etc.), it is necessary to obtain the mutex information and record the state update in the mutex information. If the group identification of the authorized specified group is recorded in association with the document identification of the target shared document in the mutex information, the relevant identifications can be read together when obtaining the mutex information. Compared to recording the above identifications in other place than the mutex information, there is no need to add additional reading and writing steps, thus effectively preventing the introduction of instability factors. In addition, the correct update of the mutex is a necessary condition for the shared state update. Through the above approach, it can be considered that if the shared state is updated, the group identification of the authorized specified group and the document identification of the target shared document will be correctly recorded in the mutex information, which not only facilitates information management but also can effectively ensure information security and prevent the leakage of document permissions.

When the group identification of the specified group is recorded in association with the document identification of the target shared document, the specified group can be regarded as a permission group that currently has access permissions to the target shared document, and the identification of the specified group is the identification of the permission group.

Based thereon, when the first user grants the specified group the access permissions to the associated document of the target shared document, the document identification of the associated document may also be recorded in the mutex information. In some embodiments, the associated document is a sub-document of the target shared document. The method provided by the embodiments of the present disclosure further comprises: in response to monitoring that the client interface of the first user jumps from the target shared document to display an associated document of the target shared document for the first time, recording the group identification of the specified group and the document identification of the associated document in association in the mutex information corresponding to the current meeting, so as to characterize that each second user in the specified group has the access permission to the associated document during the current meeting. In other implementations, the target shared document is a sub-document of the associated document, and the method provided by the embodiments of the present disclosure further comprises: before monitoring that the first user shares the target shared document to the specified group, in response to monitoring that the first user shares the associated document to the specified group during the document sharing cycle, recording the group identification of the specified group and the document identification of the associated document in association in the mutex information corresponding to the current meeting, so as to characterize that each second user in the specified group has the access permission to the associated document during the current meeting. That is to say, the relationship between the associated document and the target shared document is different, and the timing of recording the document identification of the associated document in the mutex information is also different, whereas the group identification of the specified group and the document identification of the associated document are recorded in association with each other in the mutex information when the first user confirms for the first time that the associated document is shared to the specified group.

Based thereon, the step of revoking the access permission which is owned by the second user during the document sharing cycle comprises: deleting, from the mutex information, the group identification of the specified group and the document identification of the document to which the access permission is granted within the document sharing cycle.

Figure 2:
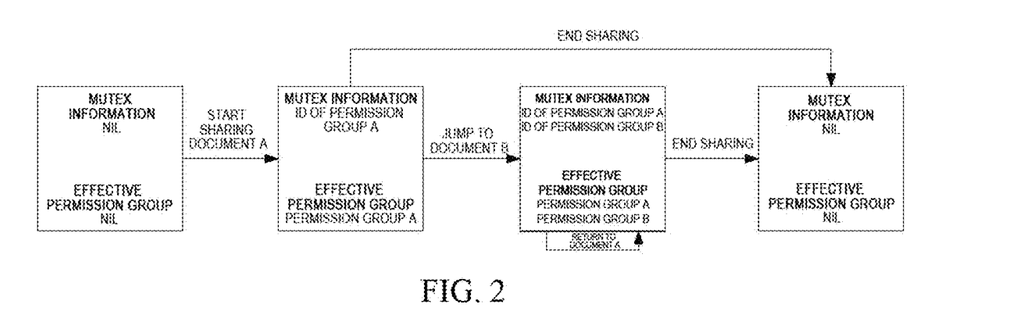
FIG. 2 is a schematic diagram of updating mutex information provided by embodiments of the present disclosure.

For the sake of understanding, assume that in the meeting, the sharer shares main document A to a specified group, that is, grants all members of the specified group access permissions to main document A. At this point, a tag as permission group A can be added to the specified group. In addition, when the sharer enters sub-document B from main document A during the document sharing cycle, it can be considered that the sharer has granted all members of the specified group access permissions to sub-document B, so a tag as permission group B can be added to the specified group. In the above scenario, reference can be made to a schematic diagram of updating the mutex information shown in FIG. 2, which shows the mutex information and clearly indicates a current effective permission group (that is, the group that currently has access permissions). For the sake of simplicity, the mutex information only briefly depicts the ID of the permission group, without depicting the corresponding document ID. However, the name of the permission group can reflect the shared document associated with it, e.g., permission group A characterizes that members of this permission group have access permissions to document A. As shown in FIG. 2, before sharing document A, both the mutex and the effective permission group are nil. After starting to share document A, the ID of permission group A is written into the mutex information, at which point the effective permission group includes permission group A. When the sharer clicks the link of sub-document B nested in main document A for the first time, it jumps to sub-document B. At this point, the ID of permission group B is written in the mutex information, that is, permission group B is created in the mutex for document B; accordingly, permission group B is also used as the effective permission group. If sharer A returns to document A from document B during this period, both the mutex information and effective permission group will remain unchanged. Therefore, even if the sharer jumps back and forth between document A and document B, members of the permission group can browse document A/document B normally without being affected. After the sharer ends the sharing, all permission group IDs recorded in the mutex information are deleted. At this point, the mutex information and the effective permission group are both nil, and the sharee's access permissions to both document A and document B are revoked.

The ID of permission group A and the ID of permission group B can both be the group ID of the specified group. In some implementations, they can be recorded in association in the form of "group identification—document A" and "group identification—document B" in the mutex, to characterize that the specified group corresponding to the group identification has access permissions to document A/document B. The embodiments of the present disclosure are not intended to limit the specific recording form.

Figure 3:
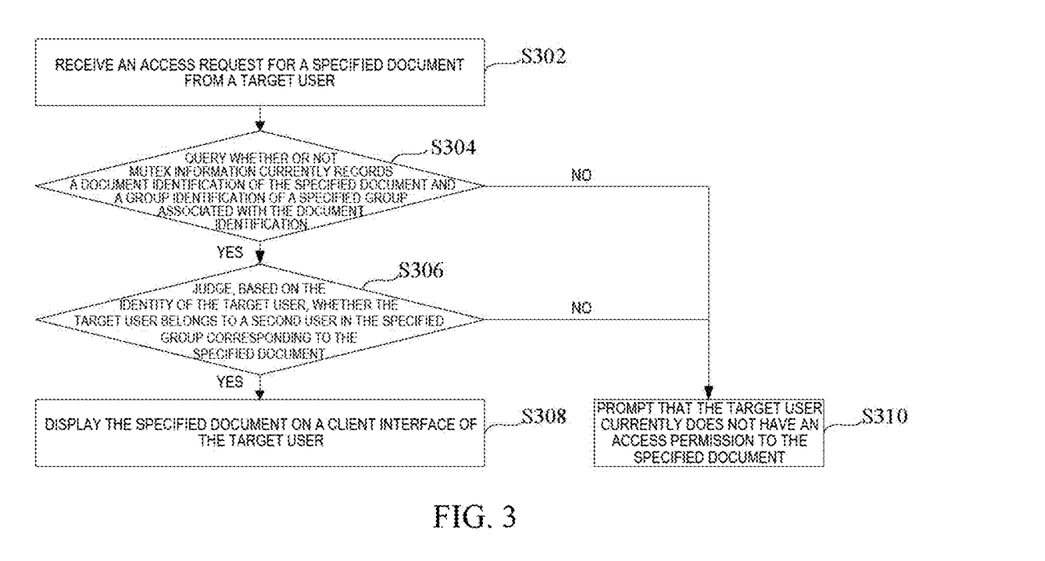
FIG. 3 is a schematic flowchart of a method for document sharing provided by embodiments of the present disclosure.

Based thereon, reference can be made to a schematic flowchart of a method for document sharing in FIG. 3. The method mainly comprises the following steps S302 to S310:

Step S302: An access request for a specified document is received from a target user.

Step S304: It is queried whether or not mutex information currently records a document identification of the specified document and a group identification of a specified group associated with the document identification; if yes (that is, there is), step S306 is performed. If not (that is, there is none), step S310 is performed. That is, if the mutex information has recorded relevant identifications, it means that the specified group has been granted access permissions to the specified document. The specified document may be a target shared document or an associated document.

Step S306: It is judged whether or not the target user belongs to a second user in the specified group corresponding to the specified document based on the identity of the target user; if yes, step S308 is performed; if not, step S310 is performed. It can be understood that members (second users) included in the specified group are all known. In practical applications, the identity of each member of the specified group can be recorded, so a judgment as to whether the target user is in the specified group can be made based on the identity of the target user.

Step S308: The specified document is displayed on a client interface of the target user. That is, after confirming that the target user has the access permission to the specified document, the specified document can be directly displayed on the target user's client interface for the target user to browse.

Step S310: It is prompted that the target user currently does not have any access permission to the specified document.

With the above approach, the group that currently has access permissions to the specified document can be directly judged based on the mutex information, and then based on the group, it can be judged whether the specified document can be displayed to the target user. Not only the information security can be effectively ensured, but also it is quite convenient and fast to directly query the mutex information for judgment.

In summary, if the above permission processing approach provided by the embodiments of the present disclosure is adopted, the following scenarios can be presented as an example:

Scenario 1: A document sharing cycle begins, the sharer shares main document A, and the sharee obtains the access permission to main document A and chooses to use a free browsing mode to browse freely in main document A. During this period, the sharer clicks to enter nested sub-document B from main document A, the sharee staying at main document A still has the access permission to main document A until the end of the document sharing cycle. In addition, after the sharer enters sub-document B, the sharee staying in main document A will also have the access permission to sub-document B until the end of the document sharing cycle.

Scenario 2: A document sharing cycle begins, the sharer shares main document A and clicks to enter nested sub-document B from main document A. The sharee in the following mode follows to enter sub-document B and switches to a free browsing mode in sub-document B for free browsing. During this period, the sharer returns from sub-document B to main document A, the sharee staying in sub-document B still has the access permission to sub-document B and can still read sub-document B. At the same time, the sharee also has the access permission to main document A until the end of the document sharing cycle.

Scenario 3: The sharer shares documents in a branch venue. Specifically, the access permissions to main document A and sub-document B are granted to the participant group members in the branch venue. After a participant exits the branch venue and enters a main venue, he automatically exits the participant group of the branch venue and loses the access permissions to main document A and sub-document B shared by the sharer in the branch venue. On the contrary, if a participant enters the branch venue from the main venue, he will automatically join the participant group of the branch venue and have access permissions to the main document A and sub-document B shared by the sharer in the branch venue.

It should be noted that the above are only three simple exemplary scenarios and should not be regarded as limitations. For example, take the above scenario 2 as an example. The sharee may not follow the sharer into sub-document B, but after the sharer grants access permissions to sub-document B (for example, after clicking a link to enter sub-document B), the sharee who has been in free browsing mode can subsequently enter sub-document B as needed. No matter what the scenario is, as long as the sharee is granted an access permission to the document during the document sharing cycle, the access permission will be maintained until the end of the document sharing cycle (such as the sharer stops sharing or replaces a new document), without being affected by the sharer jumping between the main document and sub-document.

To sum up, according to the method for permission processing provided by the embodiments of the present disclosure, during a document sharing cycle, the sharee can retain the access permission until the end of the document sharing cycle after obtaining the access permission to the target shared document authorized by the sharer. Cases will not happen any more in which because the sharer jumps back and forth between the main document and sub-document, the sharee's access permission will be withdrawn, and the sharee cannot browse the target shared document normally. Therefore, the document sharing effects are effectively guaranteed, the user's document sharing experience is improved, and it helps to further ensure the smooth progress of online meetings.

Figure 4:
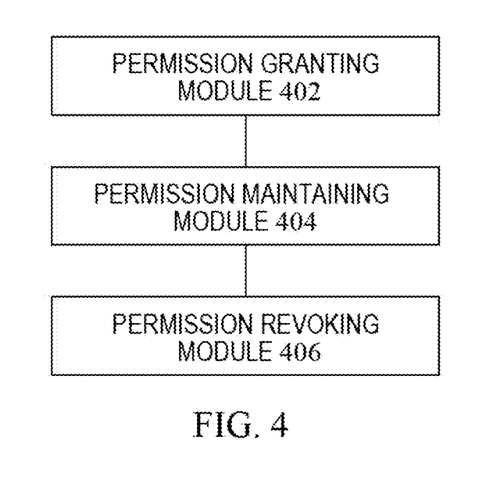
FIG. 4 is a schematic structural diagram of an apparatus for permission processing provided by embodiments of the present disclosure.

Corresponding to the method for permission processing described above, the embodiments of the present disclosure further provide an apparatus for permission processing. FIG. 4 is a schematic structural diagram of an apparatus for permission processing provided by the embodiments of the present disclosure. The apparatus can be implemented by software and/or hardware, and generally can be integrated in an electronic device. The apparatus mainly comprises: a permission granting module 402 configured for, in response to a start of a document sharing cycle, granting each second user in a specified group an access permission to a target shared document upon monitoring that a first user shares the target shared document to the specified group; a permission maintaining module 404 configured for, in response to monitoring that a client interface of the first user jumps from the target shared document to display an associated document of the target shared document, maintaining the access permission to the target shared document for the second user and maintaining an access permission to the associated document for the second user; and a permission revoking module 406 configured for, in response to an end of the document sharing cycle, revoking the access permission which is owned by the second user during the document sharing cycle.

In this way, after the first user (i.e., the sharer) grants each second user (i.e., the sharee) in the specified group an access permission to the target shared document, the access permission can always be maintained; even if the first user jumps from the target shared document to display the associated document, the access permissions to the target shared document and associated document can also be maintained for the second user until the access permissions are revoked at the end of the document sharing cycle. Thereby, it can be avoided that the sharee cannot view the document anymore because the share jumps between documents and the access permissions of the sharee are revoked during the document sharing cycle. Furthermore, the document sharing effects can be effectively guaranteed, and the user's document sharing experience improved.

In some implementations, the apparatus further comprises: a permission determining module configured for, in accordance with a determination that an access request for a specified document is received from the second user, determining whether the second user currently has an access permission to the specified document; the specified document comprising the target shared document or the associated document; and a document displaying module configured for, in accordance with a determination that the second user currently has the access permission to the specified document, displaying the specified document on a client interface of the second user.

In some implementations, the apparatus further comprises: a continuing displaying module configured for, during the second user being in free browsing mode and a client interface of the second user being currently displaying the target shared document, continuing displaying the target shared document on the client interface of the second user in response to monitoring that the client interface of the first user jumps from the target shared document to display the associated document of the target shared document.

In some implementations, the permission granting module 402 is further configured for recording a group identification of the specified group and a document identification of the target shared document in association in mutex information corresponding to a current meeting, so as to characterize that each second user in the specified group has the access permission to the target shared document during the current meeting; wherein the current meeting is an online meeting which the specified group is currently attending.

In some implementations, the associated document is a sub-document of the target shared document, and the apparatus further comprises: a first association recording module configure for, in response to monitoring that the client interface of the first user jumps from the target shared document to display an associated document of the target shared document for the first time, recording the group identification of the specified group and the document identification of the associated document in association in the mutex information corresponding to the current meeting, so as to characterize that each second user in the specified group has the access permission to the associated document during the current meeting.

In some implementations, the target shared document is a sub-document of the associated document, and the apparatus further comprises: a second association recording module configure for, in response to monitoring that the first user shares the associated document to the specified group during the document sharing cycle, recording the group identification of the specified group and the document identification of the associated document in association in the mutex information corresponding to the current meeting, so as to characterize that each second user in the specified group has the access permission to the associated document during the current meeting.

In some implementations, the permission revoking module 406 is further configured for deleting, from the mutex information, the group identification of the specified group and the document identification of the document to which the access permission is granted within the document sharing cycle.

In some implementations, the apparatus further comprises: a mutex querying module configured for, in accordance with a determination that an access request for a specified document is received from a target user, querying whether the mutex information currently records a document identification of the specified document and a group identification of a specified group associated with the document identification; the specified document comprising the target shared document or the associated document; a user determining module configured for, in accordance with a determination that the mutex information currently records the document identification and the group identification, determining, based on an identity of the target user, whether the target user belongs to second users in a specified group corresponding to the specified document; and a document displaying module configured for, in accordance with a determination that the target user belongs to second users in the specified group, displaying the specified document on a client interface of the target user.

In some implementations, the online meeting which the specified group is currently attending is a branch-venue meeting; and the apparatus further comprises: a user adding module configured for, in response to monitoring that a target user enters the branch-venue meeting from a main-venue meeting, adding the target user to the specified group, and determining the target user as a newly added second user in the specified group; and a user removing module configured for, in response to monitoring that a target second user in the specified group returns from the branch-venue meeting to a main-venue meeting, removing the target second user from the specified group.

In some implementations, the target shared document is a main document, and the apparatus further comprises: a first determining module confiture for, in response to receiving a sharing request initiated by the first user to share the target shared document to a specified group, determining that the first user shares the target shared document to the specified group.

In some implementations, the target shared document is a sub-document embedded in a main document, and the apparatus further comprises: a second determining module configured for, in accordance with a determination that the first user shares the main document to the specified group, upon monitoring that the first user switches from the main document to the target shared document for the first time, determining that the first user shares the target shared document to the specified group.

In some implementations, the apparatus further comprises: a period determining module configured for determining the document sharing cycle based on a period from a document sharing triggering operation to a stopping sharing triggering operation of a user in a multimedia conference client.

In some implementations, the stopping sharing triggering operation is triggered by an operator of the document sharing triggering operation, or is triggered by a document sharing triggering operation of a further participant in the multimedia conference.

The apparatus for permission processing provided by the embodiments of the present disclosure can perform the method for permission processing provided by any embodiments of the present disclosure, with the corresponding functional modules and beneficial effects of performing the method.

Those skilled in the art can clearly understand that for the convenience and simplicity of description, the specific working process of the apparatus embodiments described above can be referred to the corresponding process in the method embodiments, and will not be repeated here.

Embodiments of the present disclosure further provide an electronic device. The electronic device comprises: a processor; a memory for storing executable instructions by the processor; the processor being configured for reading the executable instructions from the memory and executing the instructions to perform any of the above methods for permission processing.

Figure 5:
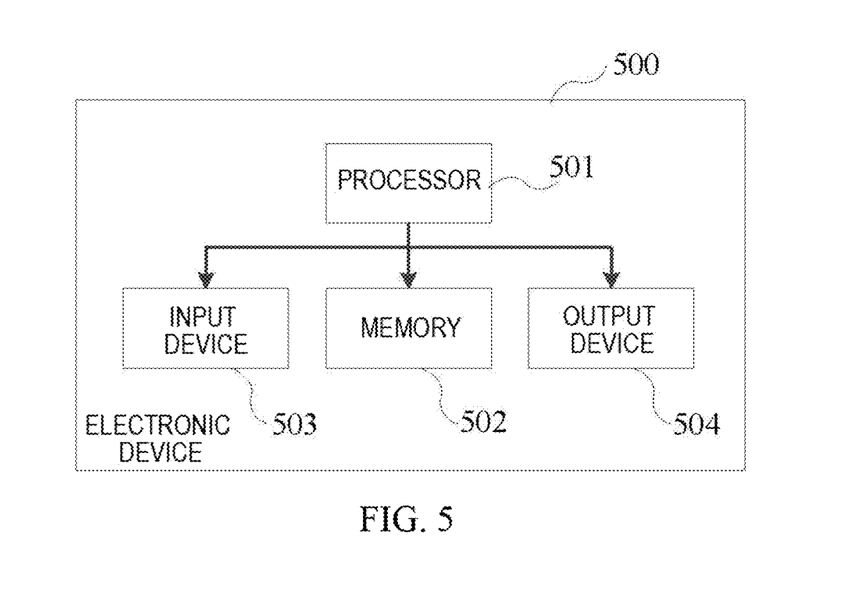
FIG. 5 is a schematic structural diagram of an electronic device provided by embodiments of the present disclosure.

FIG. 5 is a schematic structural diagram of an electronic device provided by embodiments of the present disclosure. As shown in FIG. 5, an electronic device 500 comprises one or more processors 501 and a memory 502.

The processor 501 may be a central processing unit (CPU) or other form of processing unit with data processing capabilities and/or instruction executing capabilities, and may control other components in the electronic device 500 to perform desired functions.

The memory 502 may include one or more computer program products, which may include various forms of computer-readable storage media, such as volatile memory and/or non-volatile memory. The volatile memory may include, for example, random access memory (RAM) and/or cache memory (cache), etc. The non-volatile memory may include, for example, read-only memory (ROM), hard disk, flash memory, etc. One or more computer program instructions can be stored on the computer-readable storage medium, and the processor 501 can run the program instructions to implement the method for permission processing of the embodiments of the present disclosure described above and/or other desired Function. Various contents such as input signals, signal components, noise components and the like may also be stored in the computer-readable storage medium.

In one example, the electronic device 500 may further include an input device 503 and an output device 504, these components being interconnected through a bus system and/or other forms of connection mechanisms (not shown).

In addition, the input device 503 may also include, for example, a keyboard, a mouse, and the like.

The output device 504 can output various information to the outside, including determined distance information, direction information, etc. The output device 504 may include, for example, a display, a speaker, a printer, a communication network and its connected remote output devices, and the like.

Of course, for simplicity, only some of the components in the electronic device 500 related to the present disclosure are shown in FIG. 5, and components such as buses, and input/output interfaces are omitted. In addition, the electronic device 500 may also include any other appropriate components depending on the specific application.

Besides the above methods and devices, the embodiments of the present disclosure can further be a computer program product, which includes computer program instructions. The computer program instructions, when run by a processor, cause the processor to perform the method for permission processing provided by the embodiments of the disclosure.

The computer program product may write program codes for performing the operations in the embodiments of the present disclosure in any combination of one or more programming languages, including object-oriented programming languages such as Java, C++, etc., and also conventional procedural programming languages such as the "C" language or similar programming languages. The program codes may be executed entirely on the user's computing device, partly on the user device, as a stand-alone software package, partly on the user's computing device and partly on a remote computing device, or entirely on the remote computing device or server.

In addition, the embodiments of the present disclosure can further be a computer-readable storage medium on which computer program instructions are stored. The computer program instructions, when run by a processor, cause the processor to perform the method for permission processing provided by the embodiments of the present disclosure.

The computer-readable storage medium may be any combination of one or more readable media. The readable medium may be a readable signal medium or a readable storage medium. The readable storage medium may include, for example, but is not limited to, an electronic, magnetic, optical, electromagnetic, infrared or semiconductor system, apparatus or device, or any combination of the foregoing. More specific examples (non-exhaustive list) of the readable storage medium may include, without limitation to, the following: an electrical connection with one or more conductors, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The embodiments of the present disclosure further provide a computer program product, comprising a computer program/instructions. The computer program/instructions, when executed by a processor, implement the method for permission processing in the embodiments of the present disclosure.

It should be noted that in this specification, relational terms such as "first" and "second" are only used to distinguish one entity or operation from another entity or operation, and do not necessarily require or imply there is such an actual relationship or sequence between entities or operations. Furthermore, the terms "comprise," "include," or any other variants are intended to cover a non-exclusive inclusion such that a process, method, article, or device that includes a list of elements includes not only those elements, but also other elements not expressly listed, or elements inherent to the process, method, article or device. Without further limitation, an element defined by the statement "comprises a . . . " does not exclude the presence of additional identical elements in a process, method, article, or device that includes these elements.

The above description is merely specific implementations of the present disclosure, enabling those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure is not to be limited to the embodiments described herein, but is subject to the broadest scope consistent with the principles and novel features disclosed herein.

What is claimed is:

1. A method for permission processing, comprising:
in response to a first user sharing a target shared document to a specified group, granting each second user in the specified group an access permission to the target shared document, wherein the each second user is a user in the specified group that is different from the first user, the target shared document has an associated document, and the associated document is a sub-document nested within the target shared document, or the target shared document is a sub-document nested within the associated document; and
in accordance with a determination that a client interface of the first user jumps from the target shared document to display the associated document of the target shared document, maintaining the access permission to the target shared document for the second user and configuring an access permission to the associated document for the second user by one of the following:
based on the second user being not granted the access permission to the associated document, granting the second user the access permission to the associated document, or
based on the second user already being granted the access permission to the associated document, maintaining the access permission to the associated document for the second user.

2. The method of claim 1, wherein the associated document is a sub-document nested within the target shared document, and wherein granting the second user the access permission to the associated document comprises:
in accordance with a determination that the client interface of the first user jumps from the target shared document to the associated document for the first time, granting the second user the access permission to the associated document.

3. The method of claim 1, further comprising:
in accordance with a determination that sharing of the target shared document is stopped, revoking the access permission of the second user for the target shared document, and/or
in accordance with a determination that sharing of the associated document is stopped, revoking the access permission of the second user for the associated document.

4. The method of claim 3, further comprising:
determining that sharing of the target shared document is stopped in response to one of: an operation triggered by the first user to stop sharing the target shared document, or an operation triggered by the second user to share a further target document; and/or
determining that sharing of the associated document is stopped in response to one of: an operation triggered by the first user to stop sharing the associated document, or an operation triggered by the second user to share the further target document.

5. The method of claim 1, further comprising:
determining, based on an access request of the second user for a specified document, whether the second user currently has an access permission to the specified document, wherein the specified document is the target shared document or the associated document; and in accordance with a determination that the second user has the access permission to the specified document, displaying the specified document on a client interface of the second user.

6. The method of claim 1, wherein the second user is in a free-browsing mode and a client interface of the second user is currently displaying the target shared document or the associated document, and the method further comprises:
after the client interface of the first user jumps from the target shared document to display the associated document of the target shared document, continuing displaying the target shared document or the associated document on the client interface of the second user.

7. The method of claim 1, wherein granting the second user the access permission to the target shared document comprises:
recording a group identifier of the specified group and a document identifier of the target shared document in association in mutex information corresponding to a current meeting, so as to characterize that each second user in the specified group has the access permission to the target shared document during the current meeting, wherein the specified group characterizes a set of participants attending the current meeting.

8. The method of claim 1, wherein an online meeting which the specified group is currently attending is a branch-venue meeting, and the method further comprises:
in accordance with a determination that a target user enters the branch-venue meeting from a main-venue meeting, adding the target user to the specified group, and determining the target user as a newly added second user in the specified group; and/or
in accordance with a determination that a target second user in the specified group returns from the branch-venue meeting to a main-venue meeting, removing the target second user from the specified group.

9. The method of claim 1, wherein the associated document is a sub-document nested within the target shared document, and the method further comprises:
in response to a sharing request initiated by the first user to share the target shared document to a specified group, determining that the first user shares the target shared document to the specified group.

10. The method of claim 1, wherein granting the second user the access permission to the target shared document comprises granting the second user a temporary access permission to the target shared document, and the method further comprises:
revoking the temporary access permission of the second user for the target shared document.

11. The method of claim 1, wherein before the first user shares the target shared document to the specified group, the second user has a first access permission to the target shared document, and granting the second user the access permission to the target shared document comprises: granting the second user a second access permission to the target shared document; and
the method further comprises:
revoking the second access permission of the second user for the target shared document and maintaining the first access permission of the second user for the target shared document.

12. An electronic device, comprising:
a processor; and
a memory for storing instructions executable to the processor;
the processor being configured for reading the executable instructions from the memory and executing the instructions to perform acts comprising:
in response to first user sharing a target shared document to a specified group, granting each second user in the specified group an access permission to the target shared document, wherein the each second user is a user in the specified group that is different from the first user, the target shared document has an associated document, and the associated document is a sub-document nested within the target shared document, or the target shared document is a sub-document nested within the associated document; and
in accordance with a determination that a client interface of the first user jumps from the target shared document to display the associated document of the target shared document, maintaining the access permission to the target shared document for the second user and configuring an access permission to the associated document for the second user by one of the following:
based on the second user being not granted the access permission to the associated document, granting the second user the access permission to the associated document, or
based on the second user already being granted the access permission to the associated document, maintaining the access permission to the associated document for the second user.

13. The electronic device of claim 12, wherein the associated document is a sub-document nested within the target shared document, and wherein granting the second user the access permission to the associated document comprises:
in accordance with a determination that the client interface of the first user jumps from the target shared document to the associated document for a first time, granting the second user the access permission to the associated document.

14. The electronic device of claim 12, wherein the acts further comprise:
in accordance with a determination that sharing of the target shared document is stopped, revoking the access permission of the second user for the target shared document, and/or
in accordance with a determination that sharing of the associated document is stopped, revoking the access permission of the second user for the associated document.

15. The electronic device of claim 12, wherein the acts further comprise:
determining, based on an access request of the second user for a specified document, whether the second user currently has an access permission to the specified document, wherein the specified document is the target shared document or the associated document; and
in accordance with a determination that the second user has the access permission to the specified document, displaying the specified document on a client interface of the second user.

16. The electronic device of claim 12, wherein the second user is in a free-browsing mode and a client interface of the second user is currently displaying the target shared document or the associated document, and the acts further comprise:
after the client interface of the first user jumps from the target shared document to display the associated document of the target shared document, continuing displaying the target shared document or the associated document on the client interface of the second user.

17. The electronic device of claim 12, wherein granting the second user the access permission to the target shared document comprises:
   recording a group identifier of the specified group and a document identifier of the target shared document in association in mutex information corresponding to a current meeting, so as to characterize that each second user in the specified group has the access permission to the target shared document during the current meeting, wherein the specified group characterizes a set of participants attending the current meeting.

18. The electronic device of claim 12, wherein an online meeting which the specified group is currently attending is a branch-venue meeting, and the acts further comprise:
   in accordance with a determination that a target user enters the branch-venue meeting from a main-venue meeting, adding the target user to the specified group, and determining the target user as a newly added second user in the specified group; and/or
   in accordance with a determination that a target second user in the specified group returns from the branch-venue meeting to a main-venue meeting, removing the target second user from the specified group.

19. The electronic device of claim 12, wherein the associated document is a sub-document nested within the target shared document, and the acts further comprise:
   in response to a sharing request initiated by the first user to share the target shared document to a specified group, determining that the first user shares the target shared document to the specified group.

20. A non-transitory computer-readable storage medium, wherein the storage medium stores a computer program, and the computer program is configured for performing acts comprising:
   in response to a first user sharing a target shared document to a specified group, granting each second user in the specified group an access permission to the target shared document, wherein the each second user is a user in the specified group that is different from the first user, the target shared document has an associated document, and the associated document is a sub-document nested within the target shared document, or the target shared document is a sub-document nested within the associated document; and
   in accordance with a determination that a client interface of the first user jumps from the target shared document to display the associated document of the target shared document, maintaining the access permission to the target shared document for the second user and configuring an access permission to the associated document for the second user by one of the following:
      based on the second user being not granted the access permission to the associated document, granting the second user the access permission to the associated document, or
      based on the second user already being granted the access permission to the associated document, maintaining the access permission to the associated document for the second user.

* * * * *